United States Patent [19]
Thompson

[11] 3,736,849
[45] June 5, 1973

[54] ON-FILM OPTICAL RECORDING OF CAMERA LENS SETTINGS

[75] Inventor: Richard E. Thompson, Houston, Tex.

[73] Assignee: The United States of America as represented by the Administrator of the National Aeronautics and Space Administration, Washington, D.C.

[22] Filed: Mar. 17, 1971

[21] Appl. No.: 125,236

[52] U.S. Cl.................................................95/1.1
[51] Int. Cl..............................................G03b 17/24
[58] Field of Search............................95/1.1, 11 V

[56] References Cited
UNITED STATES PATENTS 3,590,703  7/1971  Ono.....................................95/11 V

FOREIGN PATENTS OR APPLICATIONS 672,033  2/1939  Germany..............................95/1.1
335,506  7/1917  Germany..............................95/1.1

*Primary Examiner*—John M. Horan
*Attorney*—Edward K. Fein, John R. Manning and Marvin F. Matthews

[57] ABSTRACT

Apparatus is provided for recording a representation of the camera lens aperture and focus setting on the film of a camera at the same time that the photographic image is recorded on such film. A data lens means is provided intermediate the camera lens and camera film whereby the aperture and focus setting of the camera lens may be determined through measurement of both the location and the size of a data image provided by such data lens means. Such data lens means requires no electrical power, is low in weight, and does not result in an increase in the external dimensions of the camera in which such data lens means is installed.

10 Claims, 9 Drawing Figures

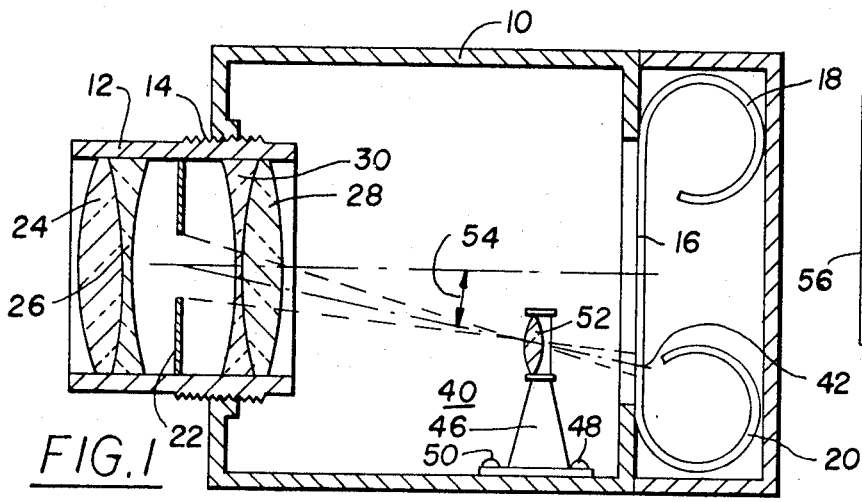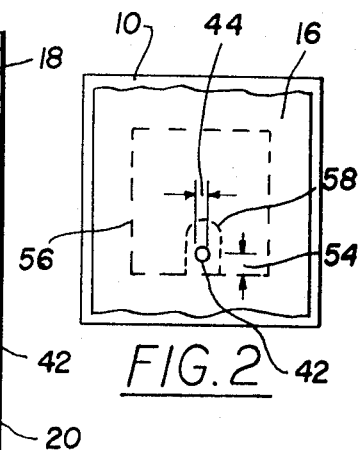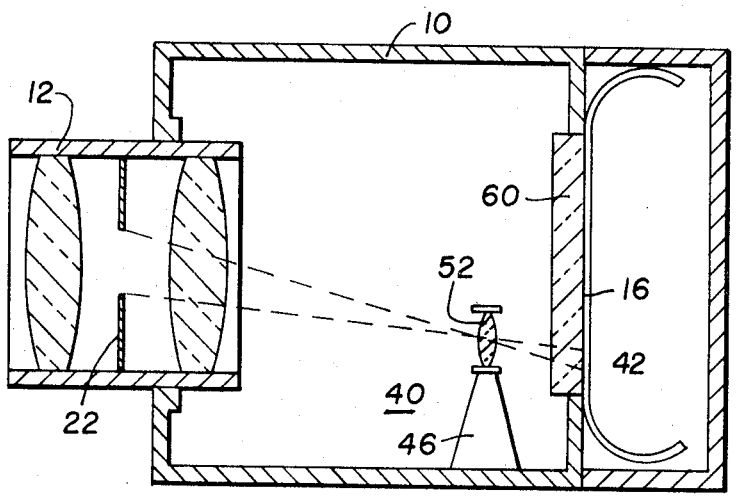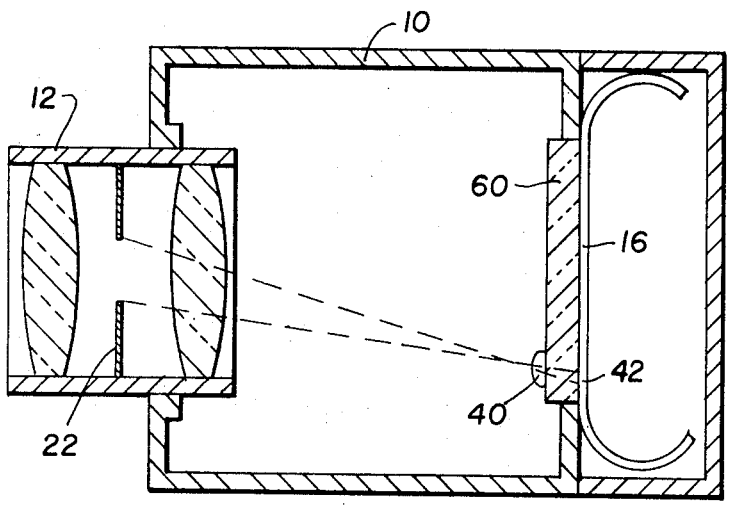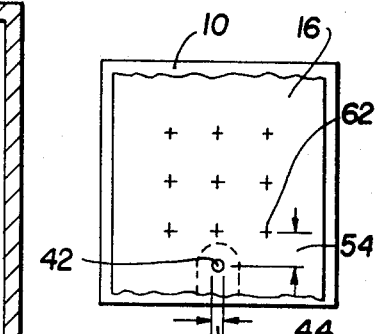
FIG. 1
FIG. 2
FIG. 3
FIG. 4
FIG. 5
INVENTOR.
RICHARD E. THOMPSON
BY Edward K. Fein
ATTORNEY

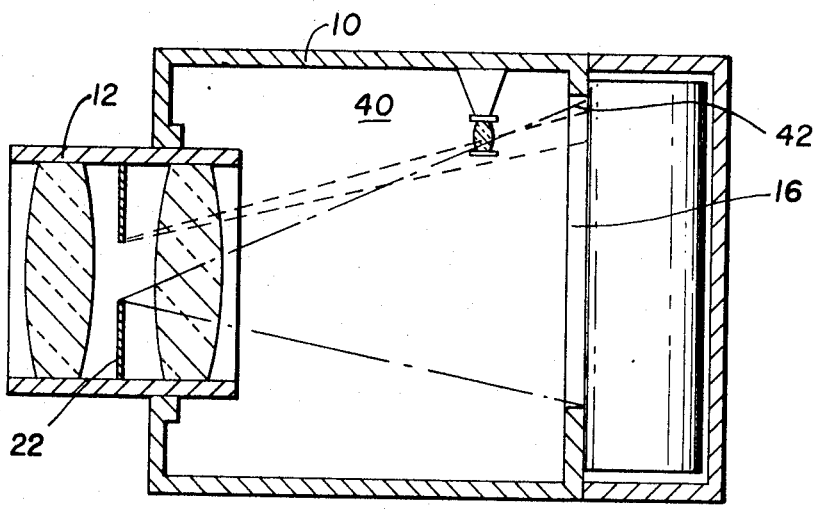
FIG. 6
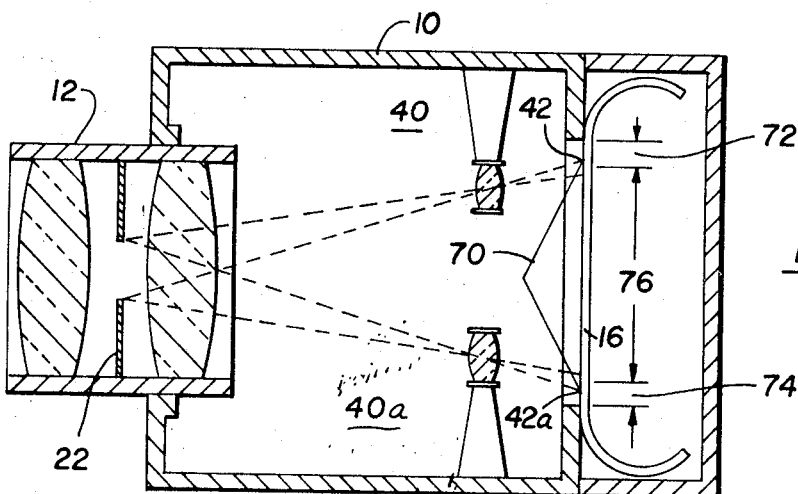
FIG. 7
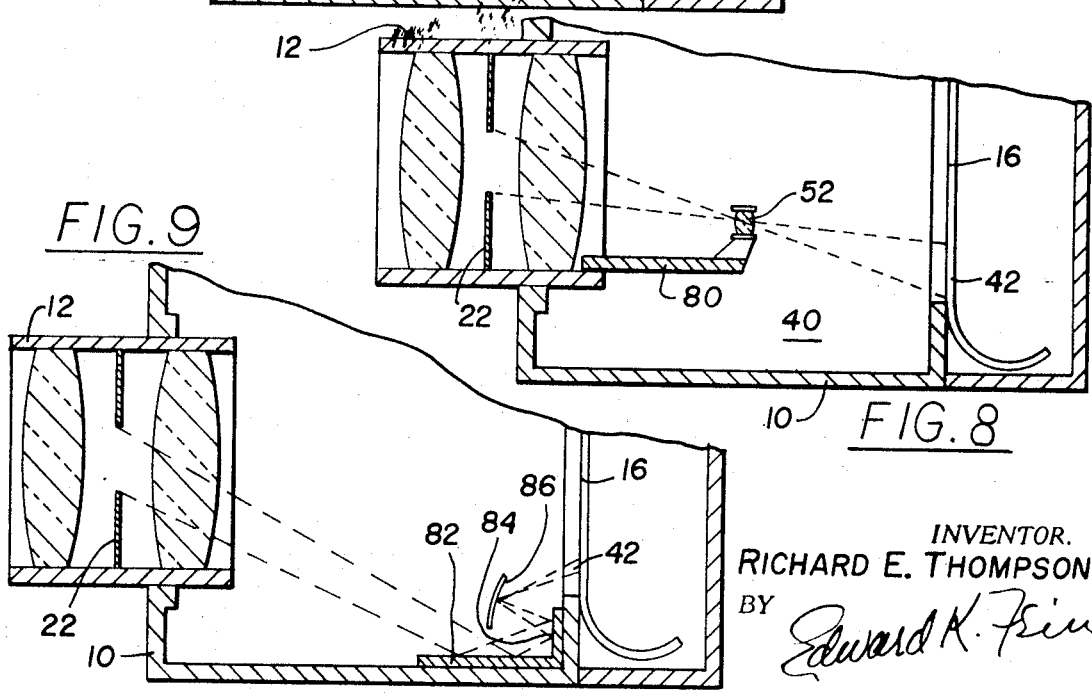
FIG. 8
FIG. 9
INVENTOR.
RICHARD E. THOMPSON
BY Edward K. Fein
ATTORNEY

ON-FILM OPTICAL RECORDING OF CAMERA LENS SETTINGS

ORIGIN OF THE INVENTION

The invention described herein was made by an employee of the United States Government and may be manufactured and used by or for the Government of the United States of America for governmental purposes without payment of any royalties thereon or therefor.

BACKGROUND OF THE INVENTION

1. Field of the Invention

The present invention relates to a camera having a data lens means for recording the camera lens aperture and focus setting on the camera film at the time a photograph is taken.

2. Description of the Prior Art

In prior art devices, the recording of lens settings sometimes was provided through a hand-written record of the lens settings as various photographs were taken. Such a hand-written record depends on the conscientiousness of the record keeper and is not possible when the camera is remotely operated or is operated by someone who has many other tasks to perform during a limited period of time, such as an astronaut. More recently, electro-mechanical devices which convert lens settings to a digital display of small lights have been used to place a coded record of the lens settings on the photographic film. However, such electro-mechanical devices require mechanical modification of the existing lens setting controls, markedly increase the camera size and weight, require electrical power, and are expensive.

Among the prior art United States patents which have been considered in the evaluation of the present invention are U.S. Pat. No. 1,886,053 issued Nov. 1, 1932 TO J. P. Scannell; U.S. Pat. No. 2,210,090 issued Aug. 6, 1940 to F. W. Lutz et al.; U.S. Pat. No. 2,250,442 issued July 29, 1941 to F. Abell; U.S. Pat. No. 2,566,509 issued Sept. 4, 1951 to J E. Albright; U.S. Pat. No. 3,216,339 issued Nov. 9, 1965 TO E. Kellenberger; and U.S. Pat. No. 3,334,561 issued Aug. 8, 1967 to N. Kondur, Jr.

Scannell discloses a means for autographing photographic film by the use of a radio responsive ray-emitting substance co-acting with the film.

Lutz et al disclose an aerial photographic device for providing a stabilized reference mark on film in order to register on the photograph a point on the ground vertically beneath the camera at the instant of exposure of the film. A gyro-stabilized light-projection means is optically imaged on the film.

Abell disclosed an apparatus to record the speed of a vehicle. A camera mounted in a second vehicle traveling in the same direction and at the same speed as a first vehicle is provided with a split screen means such that the image of a speedometer registering the speed of the second vehicle is directed onto the film recording photographs of the first vehicle.

Albright discloses in a television system a means for projecting through an auxiliary lens a secondary image on a portion of the image electrodes so as to provide a superimposed indicator in conjunction with the principal image.

Kellenberger discloses a character recording means in a photographic camera featuring a character-carrying slide positioned in the ray path traversing the camera body so that upon exposure, the characters on the slide are photographically recorded on one edge of the film.

Kondur, Jr. discloses apparatus for recording camera settings directly on the film as the present invention. Kondur, Jr., however, relies on mechanical means coupled to the various selector knobs to uncover particular apertures which correspond to the various settings so that a mark is exposed on the film, the position of which mark in indicative of the camera setting. Another embodiment describes an apparatus for physically punching a mark into the film. Although Kondur, Jr. discloses a means for recording indicia on the film relative to camera settings as does the present invention, Kondur, Jr. relies on mechanical linkages connected to selector knobs of the camera.

None of the prior art discloses or even suggests the incorporation of a system to record on the film indicia of the camera lens aperture and focus position directly from an image exposed on the film.

SUMMARY OF THE INVENTION

The present invention is related to a conventional camera which has a data lens means added to allow recording directly on the camera film the lens aperture and focus setting of the camera. Such data lens means allows the camera lens iris diaphragm to be imaged onto the camera film so that the lens focus setting can be determined indirectly. Also, the imaging of the camera lens iris diaphragm onto the camera film is provided so that the lens aperture setting can be determined indirectly. The iris size required for a full automated exposure system may be determined after exposure regardless of the shape of the iris opening.

The data lens means may be utilized without substantial modification to most cameras and does not require electrical power or substantial increases in camera weight, and may be utilized in various types of cameras.

BRIEF DESCRIPTION OF THE DRAWINGS

FIG. 1 is a cross-sectional view of a typical camera showing the data lens means installed on a refractive optical data system;

FIG. 2 is a back view depicting the data image as seen on the film of FIG. 1;

FIG. 3 is a cross-sectional view of a camera with a glass reseau plate close to the film and a refractive data system installation;

FIG. 4 is a cross-sectional view of a glass reseau camera with a data lens mounted on the glass reseau plate;

FIG. 5 is a film view of a reseau camera with a refractive data system installation;

FIG. 6 is a cross-sectional view of a camera in which the refractive data system places the data image just outside of the useful picture area;

FIG. 7 is a cross-sectional view of a camera depicting the combined use of two refractive data systems;

FIG. 8 is a cross-sectional view of a camera showing the data lens means mounted on the camera lens; and FIG. 9 is a cross-sectional view of a camera incorporating a reflective data imaging system.

DETAILED DESCRIPTION

Referring now to the drawings in detail, FIG. 1 is a cross-sectional view of a typical camera showing the data lens means installed on a refractive optical data system. A camera housing 10 has positioned thereon camera lens assembly 12. Camera lens assembly 12 may be threadedly coupled at coupling 14 to allow movement of the lens assembly 12 for focusing upon a film 16 which may be on rolls 18 and 20 which rotate in a conventional manner well known in the art. The camera lens assembly 12 of FIG. 1 includes an adjustable iris diaphragm 22 and glass elements 24 and 26 and glass elements 28 and 30. The camera lens assembly 12 is focused by movement in and out of the camera body 10 until the desired photographic subject is sharply imaged on film 16.

Data lens means 40 is positioned in such a manner that the iris diaphragm 22 provides image 42 on the film 16. The image 42 is at an off-axis location. As the diameter of the iris diaphragm 22 is adjusted in order to set the exposure for the photographic subject, the data image width changes proportionately. The data image width 44 is shown in FIG. 2. Also shown in FIG. 2 is the image 42 provided from the data lens means 40.

The data lens means 40 shown in FIG. 1 includes a support 46 coupled to the camera body 10 through suitable fastening means such as a screw 48 and a screw 50. Positioned on support 46 is a lens 52 which acts in conjunction with the iris diaphragm 22 so that the off-axis angle 54 allows data image 42 to be positioned on the film 16.

The movement of the iris diaphragm 22 produces a change in the data image lateral position 54 as shown in FIG. 2 and also provides a change in the data image width 44 as mentioned previously.

The optical properties of the data lens 52 must be selected to work in combination with any lens elements 24, 26, 28, and 30 that may be utilized in positioning the data image through the data lens 52. The aberrational contributions of the data lens 52 must be minimized to the degree that provides an image 42 suitable for the required precision of the measurements 44 and 54 shown in FIG. 2. The illumination of the data image 42 depends directly on the general photographic scene luminance, the off-axis angle 54, and the effective aperture of the data lens 52. The data image 42 can be placed in an off-axis position which is within the image field of camera lens assembly 12 and in which usable film 16 may exist. A satisfactory, fixed measurement baseline such as the normal image border 56 shown in FIG. 2 must exist. Since a refractive data lens 52 will produce a shadow such as shadow 58 shown in FIG. 2 on the film 16, it has been found best to position the data image 42 near the picture border 56 or completely out of the picture area in order to minimize loss of useful picture content.

FIG. 2, it will be remembered, is a back view depicting the data image seen on the film of FIG. 1 and it is thought that the data image 42 and its position has been described in sufficient detail to enable a person skilled in the camera art to practice the present invention without difficulty. It will appreciated that the camera body 10 has film 16 positioned therein and the positioning indicators, namely 44 and 54, allow determination of the camera lens aperture setting and the focus setting.

FIG. 3 is a cross-sectional view of a camera with a glass reseau plate close to the film with a refractive data system image utilized. The reseau camera depicted in FIG. 3 is similar to the hand-held camera used by the National Aeronautics and Space Administration on the lunar surface in the Apollo missions. The glass reseau plate 60 has an optical element that also must be considered in the determination of the properties required for the data lens means 40 which includes a support 46 and lens 52 positioned on camera body 10. As explained previously, the data lens means 40 allows a data image 42 to be positioned on film 16 as the iris diaphragm 22 is varied. The data image 42 shown in FIG. 3 will, of course, vary in size and position as the position of the camera lens assembly 12 is varied.

FIG. 4 is a cross-sectional view of a reseau camera with a data lens mounted on the glass reseau plate. The arrangement set forth in FIG. 4 is similar to that shown in FIG. 3 except that the data lens means 40 has been positioned on the reseau plate 60 to allow the image 42 to be positioned on film 16 responsive to the movement of camera lens assembly 12 in the camera body 10. Iris diaphragm 22 provides the image positioning set forth at image 42.

FIG. 5 is a film view of the reseau camera shown in FIG. 4 wherein a refractive data system is provided. A reseau cross 62 may be used as a convenient fixed measurement base line. As pointed out in conjunction with FIG. 2, the camera body 10 has positioned therein film 16 and the image width 44 of image 42 is correlated with the image lateral position 54. The size of image 42 varies with the camera lens assembly 12 setting insofar as aperture setting and focus setting is concerned, as has been pointed out previously.

FIG. 6 is a cross-sectional view of a camera in which the refractive data system places the data image just outside of the useful picture area. The camera body 10 shown in FIG. 6 has data lens means 40 positioned so that the data image 42 on film 16 is outside of the regular or full picture area so that considerably more film must be available when the embodiment of the present invention shown in FIG. 6 is utilized. The data image 42 shown in FIG. 6 will allow pertinent information to be calculated after exposure of the film as has been pointed out previously.

FIG. 7 is a cross-sectional view of a camera depicting the combined use of two refractive data image systems. Camera body 10 has positioned therein camera lens assembly 12 and iris diaphragm 22. The data images are separated by distance indicator 70. The embodiment shown in FIG. 7 produces improved indication of the focus setting of the camera lens assembly 12 because the data image distance indicator 70 changes twice as much as either image position indicated at 72 and 74. The distance between image positions 72 and 74 is shown at 76 and the distance 76 changes twice as much as the position of image 72 or image 74. Data lens means 40 and data lens means 40A shown in FIG. 7 are substantially identical so that the image 42 and the image 42A are provided. The embodiment of the present invention shown in FIG. 7 may be used to calculate pertinent information as has been pointed out previously.

FIG. 8 is a cross-sectional view of a camera showing the data lens means mounted directly on the camera lens assembly. The camera lens assembly 12 is positioned in camera body 10 and support means 80 allow the data lens 52 of the data lens means 40 to move away from film 16 as the camera lens assembly 12 moves. Data image 42 is provided on the film 16 as pointed out previously. The opening in iris diaphragm 22 provides a change in size of the data image 42. The arrangement shown in FIG. 8 is particularly adaptable for cameras which have interchangeable lenses. The data lens means 40, as pointed out previously, is positioned on the camera lens assembly 12 and the data image 42 is provided on film 16.

FIG. 9 is a cross-sectional view of a camera incorporating a reflective data imaging system. Camera body 10 having camera lens assembly 12 and iris diaphragm 22 positioned therein has the data image 42 positioned on film 16 after being reflected from surface 82, surface 84, and suitable member 86. The embodiment shown in FIG. 9 has the advantage of having no chromatic abberational effects and of not casting a shadow in the picture area of film 16. The required reflective components may be more difficult to obtain and install, however, in the embodiment shown in FIG. 9.

Thus, the present invention as exemplified by the illustrated embodiments removes the burden of recording the lens aperture and focus setting while providing a permanent record of these parameters directly on the film at the time a subject is photographed. The data imaging systems are well within the state of the optical art and are relatively inexpensive to obtain and inexpensive to install. The resultant data system provided by the present invention requires no electrical power, is low in weight, and does not add to the external size of the camera on which the data system is utilized.

I claim:

1. In a camera adapted to expose and record a principal image on photosensitive material, said camera including a camera body having a receptacle for the photosensitive material and adjustable camera lens means including diaphragm means operably associated with said camera body, the improvement comprising:
   optical data means positioned in said body for optically imaging and recording (selected settings of said adjustable camera lens means) the diaphragm means aperture directly on said photosensitive material in conjunction with the principal image in direct correspondence to selected settings of said camera lens means at the time the image was recorded.

2. Apparatus defined by claim 1 wherein said data lens means include support means and a lens positioned on said support means.

3. Apparatus defined by claim 1 wherein said selected settings of said camera lens means (recorded by said optical data means) include aperture and focus settings.

4. Apparatus defined by claim 1 further including a reseau plate positioned in said body.

5. Apparatus defined by claim 1 wherein said optical data mans is fixedly positioned in said body.

6. Apparatus defined by claim 1 wherein said camera lens means includes a support, and said optical data means is positioned on said support in fixed relation to said camera lens means.

7. Apparatus defined by claim 1 wherein said optical data means includes a lens.

8. Apparatus defined by claim 1 wherein said optical data means comprises a plurality of reflective surfaces.

9. Apparatus defined by claim 1 wherein said optical data means comprises a plurality of refractive data systems.

10. A method of determining selected camera lens parameters, said method comprising the steps of
    exposing film in a camera having data lens means for providing indicia on said film upon exposure thereof, and
    measuring the size and location of said indicia.

* * * * *